Patented July 10, 1923.

1,461,340

UNITED STATES PATENT OFFICE.

RALPH RANDOLPH ADAMS, OF YONKERS, NEW YORK.

RADIOACTIVE SPRAY MATERIAL.

Application filed August 20, 1915, Serial No. 46,492. Renewed November 24, 1922.

*To all whom it may concern:*

Be it known that I, RALPH RANDOLPH ADAMS, a citizen of the United States of America, and a resident of Yonkers, county of Westchester, and State of New York, have invented certain new and useful Improvements in Radioactive Spray Materials, of which the following is a specification.

The object of this invention is to provide a radio-active substance for the purpose of stimulating plant growth. A further object is to provide a radio-active substance for the prevention and destruction of insects, larvæ, eggs, bacteria and fungi which are injurious to plants or animals. A further object is to provide a material having these properties which can be efficiently applied by spraying, and which will adhere to the parts of plants above ground, as for example to the stems, leaves and fruit surfaces, or to the fur, feathers or skin of animals which are bothered by pests, or to walls and other surfaces which may harbor the pests, thereby holding the radio-active substances in contact for such length of time that the radium emanations will be effective. A further object is to combine with the radio-active material for simultaneous application, such substances as are directly poisonous to the insects, larvæ, bacteria and fungi.

To this end I take any radio-active material, such as radium-bearing barium salts, radium sulphate, or other compounds which are a suitable vehicle or carrying medium through which a substantially uniform distribution of the radium can be readily effected. This material is brought into solution or finely pulverized and brought into suspension in water, and to the solution or mixture is added a suitable adhesive such as glue or casein, or calcium hydrate may be precipitated therein, thereby producing a gelatinous compound containing radium and with adhesive properties, which is preferably sufficiently liquid to admit of application by spraying.

In order that the compound may have further value there may be also combined with it mineral poisons which are effective insecticides and fungicides, such as arsenate of lead, Paris green, arsenite of zinc, lime sulphur, or copper sulphate and lime known as bordeaux mixture, separately or in combination. A suggested proportion of these ingredients is such an amount of the vehicle as will bring ten to fifty micrograms of radium into fifty gallons of water, depending upon whether it is merely desired as a stimulant or also as an insecticide and fungicide. Poisons if added may be with the usual dilution.

By reason of the presence of the radium, injurious insects, larvæ, eggs, bacteria and fungi, which may be within the tissues of the plants or within rolled or folded leaves or under the skin of an animal or protected by scales or shells from the reach of poisons in powered or liquid form, will be reached by the radium emanations passing through the plant tissues, skin, scales or shells and destroyed.

What I claim as new, and desire to secure by Letters Patent of the United States, is—

1. A spray material for stimulating plant growth consisting of a suitable vehicle containing radium in combination with an adhesive material, substantially as described.

2. A spray material for stimulating plant growth consisting of a suitable vehicle containing radium in combination with an adhesive material and insecticide, substantially as described.

3. A spray material for stimulating plant growth consisting of radium-bearing barium salts in combination with an adhesive material, substantially as described.

4. A spray material for stimulating plant growth consisting of radium-bearing barium salts in combination with an adhesive material and insecticide, substantially as described.

5. A spray material for stimulating plant growth consisting of radium-bearing barium salts in combination with an adhesive material and arsenate of lead, substantially as described.

Signed by me at New York, N. Y., this 18th day of August, 1915.

RALPH RANDOLPH ADAMS.

Witnesses:
SAMUEL W. BALCH,
HUGH H. SENIOR.